Dec. 11, 1923.    1,476,834
H. W. PLEISTER
NAIL EXPANSION
Filed Oct. 22, 1921    2 Sheets-Sheet 1
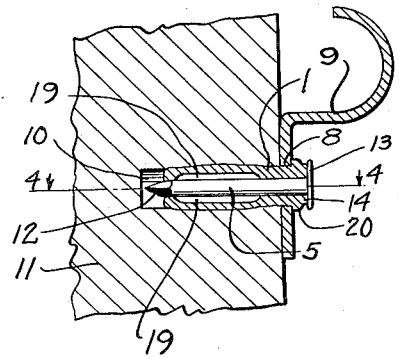
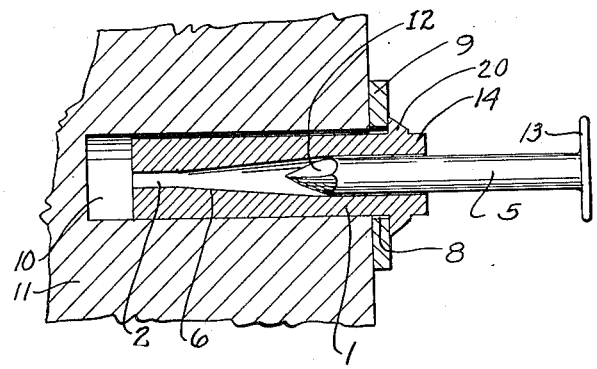
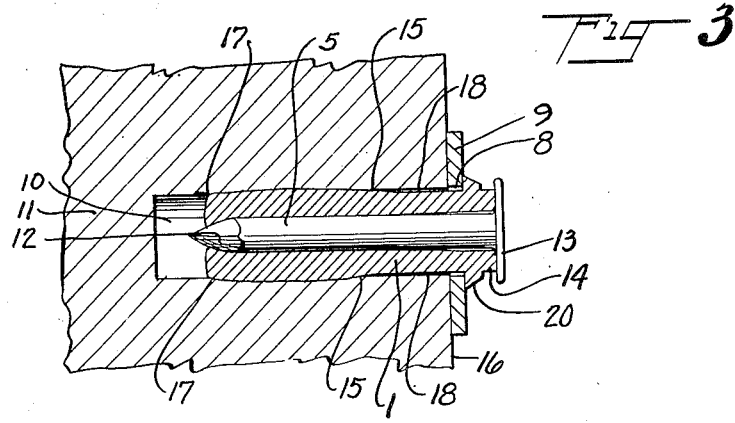
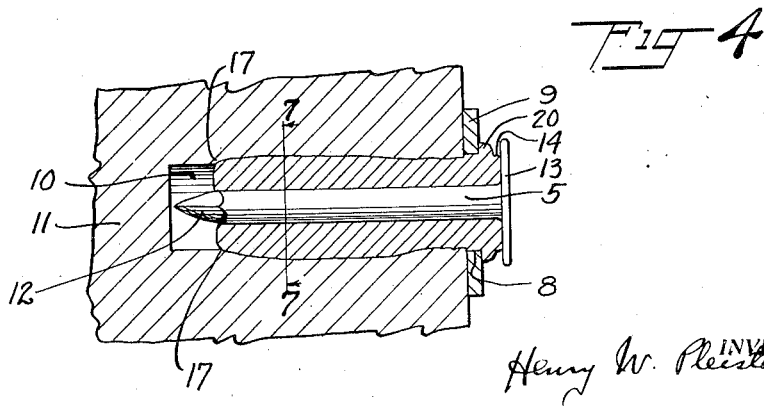
INVENTOR
Henry W. Pleister
BY
Alan M. Johnson
ATTORNEY Dec. 11, 1923.
H. W. PLEISTER
NAIL EXPANSION
Filed Oct. 22, 1921    2 Sheets-Sheet 2
1,476,834
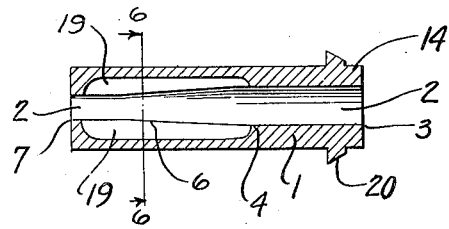
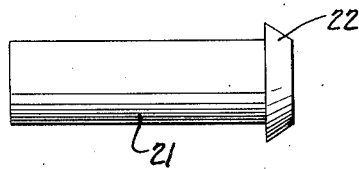
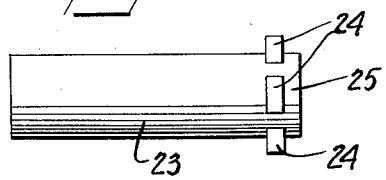
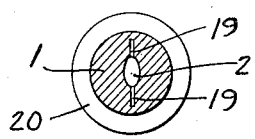
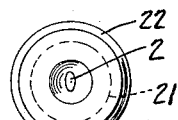
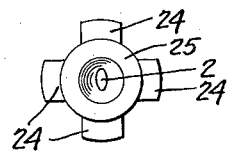
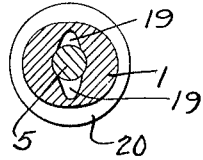
INVENTOR
Henry W. Pleister
BY
Alan M Johnson
ATTORNEY Patented Dec. 11, 1923.

1,476,834

UNITED STATES PATENT OFFICE.

HENRY W. PLEISTER, OF WESTFIELD, NEW JERSEY, ASSIGNOR TO HENRY B. NEWHALL.

NAIL EXPANSION.

Application filed October 22, 1921. Serial No. 509,610.

*To all whom it may concern:*

Be it known that I, HENRY W. PLEISTER, a citizen of the United States, residing at Westfield, in the county of Union and State of New Jersey, have made certain new and useful Improvements in Nail Expansions, of which the following is a specification taken in connection with the accompanying drawings.

This application covers a species of the genus covered by my generic application Ser. No. 509,609, filed herewith.

My invention relates to nail expansions in which by merely driving the nail into the expansion the work is secured to the wall or other suitable support.

My invention more particularly relates to protecting the nail from moisture so that it will not rust materially in the expansion, thereby lengthening the life of the fastening.

My invention further relates to a combined nail expansion and plug. Further to a nail expansion which is provided with two sets of expanding means, one operated by the point, or forward end of the nail, and the other operated by the head of the nail.

My invention further relates to a ductile anchor or body member provided with a radially closed axial bore, extending throughout its length, having different diameters, and provided with interior axial grooves extending towards but not reaching the periphery of the anchor.

My invention further includes an anchor provided with one or more stops, and a ductile member or extension which is compressed by the head of the nail as the nail is driven home.

My invention further relates to certain combinations, sub-combinations, articles of manufacture, and details of construction, all of which will be more fully hereinafter described and pointed out in the claims.

In the drawings I have shown different embodiments of my invention, but it is of course to be understood that my invention is not to be confined to the embodiments shown by way of illustration.

Fig. 1 is a vertical section of one form of my invention;

Fig. 2 is a horizontal section on an enlarged scale on line 4—4 of Fig. 1 showing the parts in their first securing position;

Fig. 3 is a horizontal section, the same as Fig. 2, showing the nail driven in until its head is flush with the ductile member or extension of the anchor or body member;

Fig. 4 is a horizontal section on an enlarged scale, on the line 4—4 of Fig. 1, showing the next and final step after that illustrated in Fig. 3;

Fig. 5 is a vertical section of the form of ductile anchor or body member shown in Figs. 1 to 4 inclusive;

Fig. 6 is a vertical section on the line 6—6 of Fig. 5;

Fig. 7 is a cross-section on the line 7—7 of Fig. 4;

Fig. 8 is a side elevation of a modified form of my invention;

Fig. 9 is an end elevation of the form shown in Fig. 8;

Fig. 10 is a side elevation of another form of my invention;

Fig. 11 is an end elevation of the modifications shown in Fig. 10.

In the form of nail expansions now in use moisture readily works its way into the axial bore of the expansion, usually through slots, and also through the end of the expansion exposed to the weather. This results in water attacking the iron nail and in a comparatively short time rusting it to such an extent as to cause the work to rattle, and in some instances to fall. It is customary to employ iron nails which are galvanized, but this galvanizing only protects the iron of the nail for a comparatively short time, when the moisture will begin to rust the nail. In some instances iron anchors are used which are also galvanized. This galvanizing, however, only protects the iron anchor for a limited time when it, as well as the nail will rust. If this corroding or rusting is not prevented, serious results will in time follow as above stated. These nail expansion are usually employed in concrete or brick walls which are in themselves more or less porous, and when the wall is exposed to the weather moisture will be absorbed which will work into the axial bore of the anchor or expansion.

In the form of nail expansions now used it is impossible to get a secure hold between the work supported and the expansion. The work is usually made of iron. If any portion of the iron expansion now used contacts with the iron work, further driving in of the head of the nail by hammering does not make a tighter connection between the expansion and the work. On the contrary, when the cold iron of the expansion is hammered against the cold iron of the work there is a spring rebound, which will prevent a tight fit. This spring rebound will also cause a vibration of the fastening which has a tendency to loosen the expansion within the hole.

By my invention I protect to the maximum extent the nail when it is in the expansion so that moisture cannot readily reach and rust it. I protect the nail by forming a closed continuous axial bore which will prevent moisture working into the bore. Further I preferably employ some form of ductile member or extension which serves to close the exposed opening in the hole, as the member or extension is compressed by blows of the hammer on the head of the nail. This, in effect, closes or calks the exposed end of the axial bore preventing moisture working in under the head of the nail. By using a ductile member or extension I also protect the opening in the work so that no moisture can rust the sides of the opening and enlarge it, which in time would cause the loosening of the work on the wall. My ductile member or extension also performs the function of calking the opening in the exposed surface of the wall. My ductile member or extension is preferably integral with my ductile anchor or body member and permits of two different and successive expansions of the anchor or body member; first, at the inner end, by the end of the nail expanding the end of the anchor which is imbedded in the wall; and, second, by the head of the nail causing the ductile metal of the nail expansion to flow or expand into the irregularities of the opening in the wall, forming thereby the double expansion.

This form of my invention is therefore a combined expansion and plug closing the opening in the wall. I believe myself to be the inventor of this broad feature, and have made broad claims to it in my generic application filed herewith.

I have shown in the drawings different forms of my invention simply by way of example. It is of course to be understood that my invention is not to be confined to these particular forms.

I preferably form my anchor 1 of some ductile material as for example lead or an alloy. This anchor or body member is provided with an axial bore 2, Figs. 2 and 5, which is continuous from end to end and closed, except at the ends of the anchor. From the point 3 to approximately the point 4, Fig. 5, the bore is not tapered and is of sufficient diameter to permit the nail 5 to pass through it without compressing the material of the anchor or body member. From the point 4 to the point 6, the bore is provided with a tapering and preferably elliptical bore. From the point 6 to the point 7, the bore is preferably of one diameter but smaller than is the axial bore from the point 3 to the point 4, Fig. 5.

In using my nail expansion the anchor or body member 1 is passed through the hole 8 in the work 9 of any description, and then into the hole 10 within the wall or other suitable support 11. The nail 5 is then inserted as shown in Fig. 2, by driving the nail into the axial bore 2 so that its end 12 passes along the tapered elliptical portion of the bore extending from points 4 to 6, Fig. 5. The head 13 of the nail will then be brought into contact with the member or extension 14 of the expansion as shown for example in Fig. 3. This will cause the body member or anchor to expand from approximately the points 15 and 17, Fig. 3, the head 13 then being flush with member or extension 14. This causes the main expansion to occur in the hole 10 back of the surface 16 of the wall or other suitable support 11. Up to this point there has been no appreciable expansion of the anchor or body member between the point 15 and the member or extension 14, leaving a slight space 18 which is shown somewhat exaggerated in Fig. 3.

By further driving the head 13, after it has reached the position shown in Fig. 3, the nail 5 will be caused to move a little further along the axial bore 2 as shown in Fig. 4. At the same time the head 13 of the nail will compress and upset the member or extension 14, as shown in Fig. 4, causing the ductile material of the member or extension and of the anchor to be compressed and flow so that it would firmly grip not only the nail 5 but also will fill up the opening 18 and cause the metal of the anchor to firmly grip the interior surface of the work 9, and also flow into all inequalities or voids in the adjacent surface of the hole 10 filling up the space 18.

To protect the nail from moisture and to permit of the ready expansion of the ductile anchor I provide the anchor with interior axial grooves 19, 19 which extend toward, but do not reach the periphery of the anchor. When the nail is driven home as shown in Fig. 4 the elliptical bore 2, which extends between points 4 and 7, is enlarged by the nail as shown in Fig. 7, the grooves 19, 19 will be opened or enlarged to permit the more ready expansion of the anchor and yet prevent moisture working into the axial bore.

In the form of anchor shown in Figs. 1 to 5, inclusive, the ductile member or extension 14 is shown as an extension of the ductile anchor 1. This ductile member or extension is prevented from being seated within the hole 10, in the wall or other suitable support 11, by the stop 20, which is also preferably formed integral with the anchor.

The final position of the parts are shown in Figs. 1 and 4. It will be seen from this view, that my invention is not only an expansion but also a plug in which the end of the hole 10 is plugged up after the main expansion has occurred back in the hole as shown in Fig. 3. The degree to which the metal of the ductile anchor will flow depends upon the particular formation of the hole 10 of the wall. If a fair-sized hole has been drilled more metal will flow into the space 18 than if the hole had been drilled with greater precision; but in either case the flowing of the metal due to blows upon the head of the nail will fill all the voids in the adjacent sides of the hole 10, and also the hole 8 in the work 9, thereby calking the end of the hole 10 and preventing any moisture working into it.

In some cases I may form my ductile anchor or body anchor 21 with a combined ductile stop and member or extension 22, as shown in Fig. 8. In use the head 13 of the nail contacts with the combined stop and member or extension 22 and upsets it, as shown for example in Fig. 4, in which, however, a different form of member or extension is used.

In some cases I may form my ductile anchor 23 with separated stops 24, 24 and integral member or extension 25, which is simply the end of the anchor as shown for example in Fig. 10. This member or extension 25 is upset in the same manner as is the member or extension shown in Fig. 4.

Having thus described this invention in connection with illustrative embodiments thereof, to the details of which I do not desire to be limited, what is claimed as new and what is desired to secure by Letters Patent is set forth in the appended claims.

What I claim is:—

1. A ductile nail anchor having a continuous axial bore extending from end to end of the anchor and closed except at its ends, one or more stops on the exterior of the anchor to prevent it being entirely passed through the work and into a hole in a wall or other suitable support, and a separate integral ductile member or extension on the exposed end of the anchor.

2. The combination with a supporting member having a hole therein and a nail, of a nail expansion having a diameter to slide into said hole and formed of ductile material and provided initially with an axial bore to cooperate with said nail which bore is not reduced by inserting the nail expansion in the hole in which it is to be used, the ductile nail expansion being provided with one or more interior radial grooves extending from the axial bore towards but not to the periphery of the nail expansion.

3. The combination with a supporting member having a hole therein and a nail, of a nail expansion having a diameter to slide into said hole and formed of ductile material and provided initially with an axial bore elliptical in cross section to cooperate with said nail which bore is not reduced by inserting the nail expansion in the hole in which it is to be used, the ductile nail expansion being provided with one or more interior radial grooves extending from the axial bore towards but not to the periphery of the nail expansion.

4. The combination with a supporting member having a hole therein and a nail, of a nail expansion having a diameter to slide into said hole and formed of ductile material and provided initially with an axial bore to cooperate with said nail which bore is not reduced by inserting the nail expansion in the hole in which it is to be used, the ductile nail expansion being provided with a member or extension to cooperate with the head of the nail and with one or more interior radial grooves extending from the axial bore towards but not to the periphery of the nail expansion.

5. The combination with a supporting member having a hole therein and a nail, of a nail expansion having a diameter to slide into said hole and formed of ductile material and provided initially with an axial bore to cooperate with said nail which bore is not reduced by inserting the nail expansion in the hole in which it is to be used, the ductile nail expansion being provided with a member or extension a portion of which is of increased diameter to form a stop determining the position of the nail expansion in the hole, and also provided with one or more interior radial grooves extending from the axial bore towards but not to the periphery of the nail expansion.

6. The combination with a supporting member having a hole therein and a nail, of a nail expansion having a diameter to slide into said hole and formed of ductile material and provided initially with an axial bore to cooperate with said nail which bore is not reduced by inserting the nail expansion in the hole in which it is to be used, the ductile nail expansion being provided with a member or extension a portion of which is in the form of a frustum of a cone, and also provided with one or more interior radial grooves extending from the axial bore towards but not to the periphery of the nail expansion.

HENRY W. PLEISTER.

Witnesses:—
Mary A. Ryan,
Elizabeth J. Roth.